(12) United States Patent
Aggarwal et al.

(10) Patent No.: US 11,829,595 B1
(45) Date of Patent: Nov. 28, 2023

(54) AUGMENTED-REALITY-BASED FACILITY SEMANTIC MAPPING

(71) Applicant: Amazon Technologies, Inc., Seattle, WA (US)

(72) Inventors: Aayush Aggarwal, Medford, MA (US); Vishnu R Ayyagari, Boxboro, MA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 17/950,948

(22) Filed: Sep. 22, 2022

(51) Int. Cl.
| | | |
|---|---|---|
| *G06F 3/048* | (2013.01) | |
| *G06F 3/04847* | (2022.01) | |
| *G06V 20/20* | (2022.01) | |
| *G06V 20/70* | (2022.01) | |
| *G06T 19/00* | (2011.01) | |
| *G06F 30/13* | (2020.01) | |
| *G06V 10/94* | (2022.01) | |
| *G06F 111/18* | (2020.01) | |

(52) U.S. Cl.
CPC .......... *G06F 3/04847* (2013.01); *G06F 30/13* (2020.01); *G06T 19/00* (2013.01); *G06V 10/945* (2022.01); *G06V 20/20* (2022.01); *G06V 20/70* (2022.01); *G06F 2111/18* (2020.01); *G06T 2200/24* (2013.01)

(58) Field of Classification Search
None
See application file for complete search history.

(56) References Cited

U.S. PATENT DOCUMENTS

2015/0260474 A1* 9/2015 Rublowsky ............. F41A 33/00
434/16
2022/0357731 A1* 11/2022 Lekarczyk ......... G05B 23/0216

* cited by examiner

*Primary Examiner* — William C Trapanese
(74) *Attorney, Agent, or Firm* — Thomas Horstemeyer, LLP (57) ABSTRACT

Aspects of augmented reality (AR)-based facility mapping are described. In some examples, an AR device detects optical data using an optical device, and position data using a position detection device. An AR-based modification user interface is displayed using the AR device. The AR-based modification user interface includes an AR map and an AR object. The AR-based modification user interface is generated using the facility data and the sensor data. The AR-based modification user interface identifies a user action that modifies the AR object.

20 Claims, 6 Drawing Sheets

AUGMENTED-REALITY-BASED FACILITY SEMANTIC MAPPING

BACKGROUND

Facility maps are essential for both robotic and non-robotic applications to optimize the material flow by utilizing the knowledge about locations of resources in the environment. The resulting semantic maps can include permanent and semi-permanent structures as well as more mobile objects.

Existing technologies can generate semantic maps in a number of ways. For example, a person can manually operate a map editor application to a maps facility or environment items to semantics. Map editor applications can be difficult and time consuming, because the user has to know the location and dimension of the facility as well as the various resources in the environment to prepare the map. Additional options can include converting computer-aided design (CAD) layouts to semantic maps. This removes some of the manual effort involved in the editing process, but can fail to track reality because CAD layouts are often not kept up-to-date. This can cause confusion and loss of productivity in the workplace. As a result, there is a need for improved semantic mapping systems.

BRIEF DESCRIPTION OF THE DRAWINGS

Aspects of the present disclosure can be better understood with reference to the following drawings. It is noted that the elements in the drawings are not necessarily drawn to scale, with emphasis instead being placed upon clearly illustrating the principles of the embodiments. In the drawings, like reference numerals designate like or corresponding, but not necessarily the same, elements throughout the several views.

DETAILED DESCRIPTION

As outlined above, facility semantic maps can optimize operations by utilizing knowledge about locations of resources in the environment. This disclosure describes aspects of augmented reality (AR)-based facility semantic mapping. Unlike existing technologies, the present disclosure describes capturing the layout of the facility environment using sensors like camera devices and LiDAR devices and building semantic maps to object identifiers and other parameters simultaneously. This is achieved by using an AR-based user interface that facilitates real-world and AR map modifications on the same device, such as an AR headset or another AR capable device that uses camera and LiDAR sensors.

Figure 1:
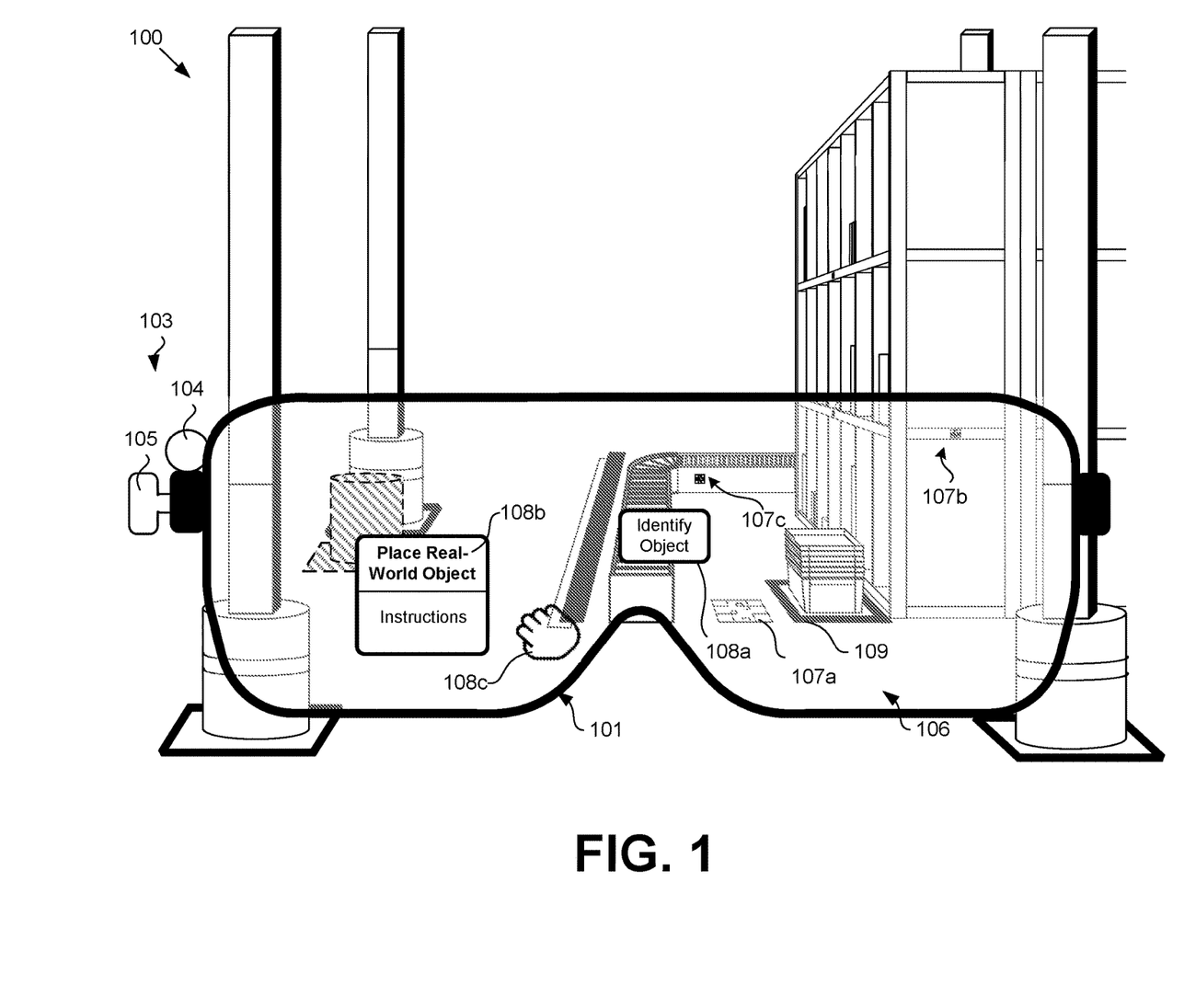
FIG. 1 illustrates an example augmented reality facility mapping system shown in a facility, according to various aspects of the embodiments of the present disclosure.

FIG. 1 shows an example facility environment 100 that can be mapped using an augmented reality mapping system. The facility environment 100 can include a fulfillment center or another industrial or commercial facility. The augmented reality mapping system can include an AR device 101 and other components. The AR device 101 can communicate with additional components such as a server-level device over a local area network (LAN) or wide area network (WAN) as described in further detail below.

The AR device 101 can include a number of sensor devices 103, including optical sensors such as a camera device 104, a LiDAR device 105, an infrared device, and other optical devices. The sensor devices 103 can also include wireless networking devices such as Bluetooth, Bluetooth Low Energy (BLE), WiFi, LiFi, and others. The sensor devices 103 can also include global positioning sensor (GPS) devices, atmospheric pressure sensor devices, accelerometer devices, gyroscope devices, and other position detection devices.

The sensor devices 103 can be used to identify a position of the AR device 101. The position can include a three dimensional location and orientation of the AR device 101. The location can include a coordinate location, such as a latitude, longitude, and elevation, x,y,z coordinates, or another three dimensional location. The orientation can include ordinal direction as well as the azimuthal angle and elevation angle of the AR device 101.

The sensor devices 103 can also be used to identify optical data such as images and video detected by the camera device 104, and distances to objects detected using the LiDAR device 105. The optical data can be used to identify shapes of objects proximal to the AR device 101, such as those in the field of view of the camera device 104, in proximity to the LiDAR device 105, and so on. The various sensor data can be provided as an input for semantic mapping of the facility environment 100.

The AR device 101 can include a display device 106. The display device 106 can include a transparent or translucent display that can overlay or project AR-based modification user interface elements 108 relative to real objects seen through the transparent or translucent display. The display device 106 can alternatively include an opaque display that can reproduce objects as well as the AR-based modification user interface elements 108 relative to the reproduced objects that are depicted. The user interface elements 108 can be overlaid on a live camera view of the camera device 104, or can be overlaid on a synthetic reproduction of the facility environment 100. Examples of AR devices 101 can include wearable devices such as AR headsets. The AR devices 101 can also include mobile phones, tablet devices, and other mobile devices that include sensor devices 103 and one or more display devices 106.

The AR device 101 can use software algorithms that integrate the optical data with the position data to generate a map of a facility or environment. The map can include objects corresponding to permanent structure objects, semi-permanent objects, and temporarily placed objects. The objects can be mapped to a location in three dimensional space as well as semantic labels that define object type and properties of the object. The objects can include a three dimensional model that can be represented in a user interface on the display device 106. The semantic labels can provide information about the objects in the user interface.

The facility environment 100 can include fiducials 107, such as the fiducials 107a, 107b, and 107c as shown. The fiducials 107 can be attached to permanent structures such as building walls, floors, ceilings, doors, docks, and columns, as well as semi-permanent and temporary objects such as tape markings, staging areas, chutes, sorters, conveyors, stations, and so on. The fiducials 107 can be used as a source of truth for location and orientation of the AR device 101, particularly those attached to permanent structures such as the fiducial 107a. The fiducials 107 can also be uniquely associated with an object in the facility environment 100. A fiducial 107 can be pre-associated with an object or permanent structure, or the AR device 101 can form the association.

A user of the AR device 101 can place the fiducial 107b on a semi-permanent storage rack. The AR device 101 can use the sensor data to uniquely identify the fiducial 107b and associate it with its location in three dimensional space, as well as with a storage rack object.

The fiducial 107c can be pre-associated with a conveyor with a set of stored properties. The fiducial 107c and can be already placed on the conveyor in the facility environment 100. The AR device 101 can identify a conveyor object, and further detect the fiducial 107c using optical data. The AR device 101 can identify that the fiducial 107c is attached to the conveyor. The AR device 101 can retrieve data pre-associated with the fiducial 107c, and can use this data to apply a set of properties to the conveyor. This can include a confirmation of the conveyor object type, a unique identifier of the conveyor, as well as full dimensions of the conveyor. Although the conveyor is not in full view of the AR device 101, the AR device 101 can use the pre-associated data to map the full shape of the conveyor before the sensor devices 103 have detected it. This can increase the speed and accuracy of mapping objects that include a fiducial 107.

An administrator can pre-assign requirements for certain types of objects such as staging areas, chutes, sorters, conveyors, stations, wireless access point devices, cameras, gantry systems, and other items. For example, an object type can be associated with a requirement or recommendation for a unique identifier. Other types of objects such as fences, passive infrastructure, barriers, tape, and other floor markings and wall markings can include or lack the requirement or recommendation for a unique identifier.

The AR device 101 can detect an object that lacks a unique identifier, or the recognition has failed to identify its object type to a predetermined threshold. The AR device 101 can generate AR-based modification user interface element 108a, and can emphasize the unidentified object for identification of semantic labels including its object type, unique identifier, and other required or recommended parameters. The AR device 101 can emphasize the unidentified object by a line type, line weight, line color, fill color, hatching, transparency effects, or highlight color.

The AR-based modification user interface element 108a can prompt the user to identify an unidentified object such as an AR object 224. The user can user a hand gesture or otherwise interact with the user interface to select the AR-based modification user interface element 108a. The AR device 101 can update the user interface with options for the user to enter, select, or otherwise identify semantic labels. In this example, the object is a conveyor object. If the object type is unidentified, the AR device 101 can update the user interface to provide a list of object types. The list can be sorted in an order based on the most likely to least likely according to a recognition algorithm used by the AR device 101 for object recognition. A user can select the semantic label corresponding to conveyor objects. Once the object type is automatically or manually identified as a conveyor object, the AR device 101 can update the user interface to provide a list of unique identifiers for conveyor objects. The AR device 101 can also provide additional properties that can be applied to conveyor objects.

In some examples, the AR device 101 can download existing data associated with the facility environment 100. This predetermined facility data can include a list of objects known or expected to be found in the facility environment 100. The predetermined facility data can in some examples include a structural map of the facility environment 100 that is generated from a known CAD drawing. The CAD drawing can be a two dimensional or three dimensional drawing. This data can be incomplete, and can lack information regarding semi-permanent and temporary objects in the facility environment 100. In some cases, the permanent structure data can be incomplete or out of date in view of modifications to the structure during initial construction or later renovation.

The predetermined facility data can also include mapped data that is uploaded to a server layer application by an AR device 101. This mapped data can be generated and uploaded based on a previous walkthrough of the facility environment 100. The AR device 101 can identify anomalies based on differences in objects and structures by comparison to predetermined facility data that is downloaded from the server layer. For example, the AR device 101 can identify that an object or structure is absent, moved, or anomalous. The AR device 101 can emphasize the anomalous object by a line type, line weight, line color, fill color, hatching, transparency, or highlight color. The AR device 101 can generate an AR-based modification user interface element 108b that prompts the user to perform a real-world modification of the facility environment 100.

In this example, the user interface element 108b can notify a user to place an object according to a visual indication in the AR user interface. The visual indication can include a visual representation of the object that is indicated in a desired location in the AR user interface. The visual representation can include an outline of the object or a three-dimensional representation of the object. The outline can be three-dimensional since the outline can be generated based on a three-dimensional model of the object as it would appear from a perspective of the AD device 101. The user can user a hand gesture or otherwise interact with the user interface to select a portion of the user interface element 108b. The user interface can be updated to provide audio, video, textual, or interactive instructions for the real-world facility modification. The instructions can indicate a location where the user can obtain or retrieve the object, as well as detailed instructions for how to correctly place the object.

The AR device 101 can identify objects such as a temporary or semi-permanent tape line 109. The AR device 101 can determine that a stack of bins is within the tape line 109. This can enable the AR device 101 to apply a semantic label indicating that the tape line 109 defines a bin placement area. If a pallet or other object is within the tape line 109, then the AR device 101 can apply a semantic label indicating that the tape line 109 defines a pallet placement area, or another type of area.

The AR device 101 can also enable a user to interact with the representations of objects. For example, the AR device 101 can allow a user to modify an errant border or outline of an object. The AR-based map modification user interface element 108*c* shows that a user is interacting with the user interface element 108 to move a misaligned border of the tape line or floor marking to match the actual floor marking.

Figure 2:
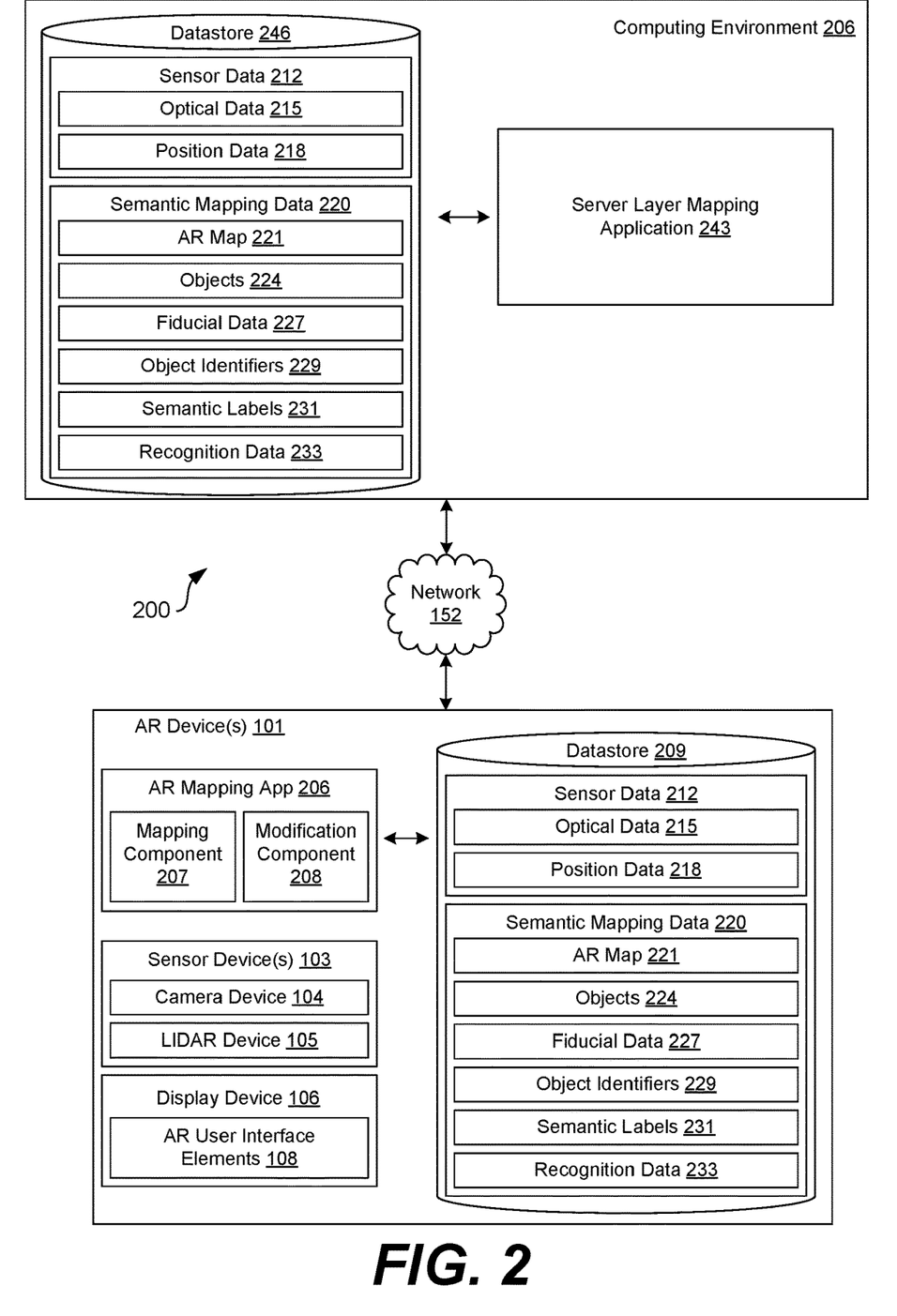
FIG. 2 illustrates an example networked environment of an augmented reality facility mapping system, according to various aspects of the embodiments of the present disclosure.

With reference to FIG. 2, shown is an AR mapping system 200 that includes the AR device 101 shown in FIG. 1, according to various embodiments. The AR mapping system 200 includes a computing environment 206, one or more AR device(s) 101, which are in data communication with each other via a network 152. The network 152 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 206 can include, for example, a server computer or any other system providing computing capability. Alternatively, the computing environment 206 can employ a plurality of computing devices that can be arranged, for example, in one or more server banks or computer banks or other arrangements. Such computing devices can be located in a single installation or can be distributed among many different geographical locations. For example, the computing environment 206 can include a plurality of computing devices that together can comprise a hosted computing resource, a grid computing resource, and/or any other distributed computing arrangement. In some cases, the computing environment 206 can correspond to an elastic computing resource where the allotted capacity of processing, network, storage, or other computing-related resources can vary over time.

Various application components and/or other functionality can be executed in the AR device 101. Data can be stored in one or more memory or datastore devices of the AR device 101, such as the datastore 209. The application components can be executed in the AR device 101. In the example shown in FIG. 2, the application components include an AR mapping application 205, among others. The AR mapping application 205 can include a mapping component 207 and an modification component 208. The datastore 209 can store sensor data 212 from the sensor devices 103, semantic mapping data 220, the AR mapping application 205, and other data.

As discussed with respect to FIG. 1, the AR device 101 can include optical sensors such as a camera device 104, a LiDAR device 105, an infrared device, and other optical devices. The sensor devices 103 can also include wireless networking devices such as Bluetooth, Bluetooth Low Energy (BLE), WiFi, LiFi, and others. The sensor devices 103 can also include global positioning sensor (GPS) devices, atmospheric pressure sensor devices, accelerometer devices, gyroscope devices, and other orientation detection devices. The sensor devices 103 can be used to identify a position including location and orientation of the AR device 101.

The sensor devices 103 can also be used to identify optical data 215 such as images and video detected by the camera device 104, and distances to objects detected using the LiDAR device 105. The optical data 215 can be used to identify shapes of objects proximal to the AR device 101, such as those in the field of view of the camera device 104, in proximity to the LiDAR device 105, and so on.

The sensor devices 103 can be used to identify position data 218 including a three dimensional location and orientation of the AR device 101. The location can include coordinates such as a latitude, longitude, and elevation, x,y,z coordinates, or another three dimensional location. The orientation can include ordinal direction as well as azimuthal angle and elevation angle of the AR device 101. The optical data 215 and the position data 218 can be provided as inputs to generate semantic mapping data 220.

The sensor devices 103 can generate sensor data 212, including the optical data 215 corresponding to the camera device 104 and LiDAR device 105, and position data 218 corresponding to the atmospheric pressure sensor devices, accelerometer devices, gyroscope devices, and other position detection devices.

The mapping component 207 can use the sensor data 212 to identify semantic mapping data 220, including the AR map 221, objects 224, fiducial data 227, object identifiers 229, and semantic labels 231. The mapping component 207 can use the recognition data 233 to map the sensor data 212 to the AR map 221, objects 224, fiducial data 227, object identifiers 229, and semantic labels 231. The recognition data 233 can include machine learning algorithms and other optical recognition rules, as well as training and verification data for these rules.

The AR map 221 can include a three dimensional AR environment that represents an actual facility environment 100. The mapping components 207 can generate the initial AR map 221 using a CAD file. The mapping components 207 can update the AR map 221 using the sensor data 212 detected using the AR device 101.

The objects 224 can include three dimensional AR representations of semi-permanent and temporary object objects that are identified using the optical data 215. The objects 224 can be associated with respective position that is identified using the position data 218. The position of an AR object 224 can be identified relative to a three dimensional map of the facility environment 100. The mapping component 207 can generate an initial three dimensional AR map of the facility environment 100 using a two or three dimensional CAD drawing of the facility environment 100. The initial map can be verified or modified using the sensor data 212.

The fiducial data 227 can include a digital representation of a fiducial, and a logical association with an AR object 224. The digital representation of the fiducial can be considered recognition data 233 that enables the AR mapping application 205 to uniquely identify the fiducial using the optical data 215. The fiducial data 227 can indicate one or more semantic labels 231 to apply to the associated object. The fiducial data 227 can also indicate a position of the fiducial in a facility environment 100. The AR mapping application 205 can calibrate its own location and orientation in the facility environment 100 using a fiducial that is placed and is pre-associated with fiducial data 227 indicating its position.

The object identifiers 229 can include unique identifiers of objects 224 that are tracked or inventoried for use in the facility environment 100. This can include unique identifiers of objects such as user working stations, staging areas, chutes, sorters, conveyors, wireless access point devices, cameras, gantry systems, and other items. The object identifiers 229 for a certain type of object can be formatted differently from those other object types. An identifier format for a particular type of object can include a certain number of characters, a type of character that is acceptable, and so on.

The semantic labels 231 can include properties that are applied to objects 224. A semantic label 231 can indicate an object type, a material of the object, a location of the object, contents of the object, logical associations with a user of the object, and so on. A semantic label 231 can specify an object identifier 229 for an object. A semantic label 231 can include a property type and property value.

A property type of a semantic label 231 can include a physical dimension such as length, width, or height, and a property value can be a measure of the dimension. A property type of a semantic label 231 can include "object name" and the property value can be a unique object identifier 229.

The modification component 208 can generate AR-based modification user interface that includes user interface elements 108 that prompt or otherwise enable a user to edit or modify the semantic mapping data 220, as well as perform real-world modifications to the facility environment 100. Since the AR mapping application 205 includes both mapping and editing components, the AR device 101 that uses this application is more efficient and effective than previous technologies. Using the AR device 101 and AR mapping application 205 can enable immediate modification of the semantic mapping data 220 while the user is present in the facility environment 100, rather than requiring trips to view the site to confirm and envision changes to the semantic mapping data 220.

Various application components and/or other functionality can be executed in the computing environment 206 according to various embodiments. Also, data can be stored in one or more memory or datastore devices accessible to the computing environment 206, such as the datastore 246. The application components can be executed in the computing environment 206. In the example shown in FIG. 2, the application components include a server layer mapping application 243, among others. The server layer mapping application 243 includes a server-layer application that can work in concert with the AR mapping application 205. The server layer mapping application 243 can provide the AR mapping application 205 with predetermined facility data including CAD drawings of the facility interior and exterior. The predetermined facility data also includes as well as sensor data 212 and semantic mapping data 220 that has already been transmitted by or received from an AR device 101.

The server layer mapping application 243 can also include a mapping component that works in concert with the mapping component 207 of the AR mapping application 205. For example, the mapping component 207 can transmit sensor data 212 to the server layer mapping application 243 to identify semantic mapping data 220 using the recognition data 233. The server layer mapping application 243 can return the semantic mapping data 220 to the mapping component 207 for reproduction using the AR device 101 for user modification and verification. The server layer mapping application 243 can also store the semantic mapping data 220. In embodiments that use the server layer mapping application 243 to process the sensor data 212, the server layer mapping application 243 can be accessed through a LAN connection to a local server rather than a public WAN such as the Internet. This can increase the speed of the recognition process from the perspective of the AR device 101.

The server layer mapping application 243 can invoke one or more of the perspective translation algorithm 158, edge detection algorithm 160, and line generation algorithm 162 in conjunction with the data 164 to generate the user interface elements 108 for display on a display device 106. In some cases, the display device 106 can be a display of an AR device 101. The server layer mapping application 243 can transmit data for rendering the user interface element 108 on the display device 106, or otherwise cause the user interface elements 108 to be rendered for display. For example, the AR device 101 can access the server layer mapping application 243 as a network service and render the user interface elements 108 for display on the display device 106.

Figure 3:
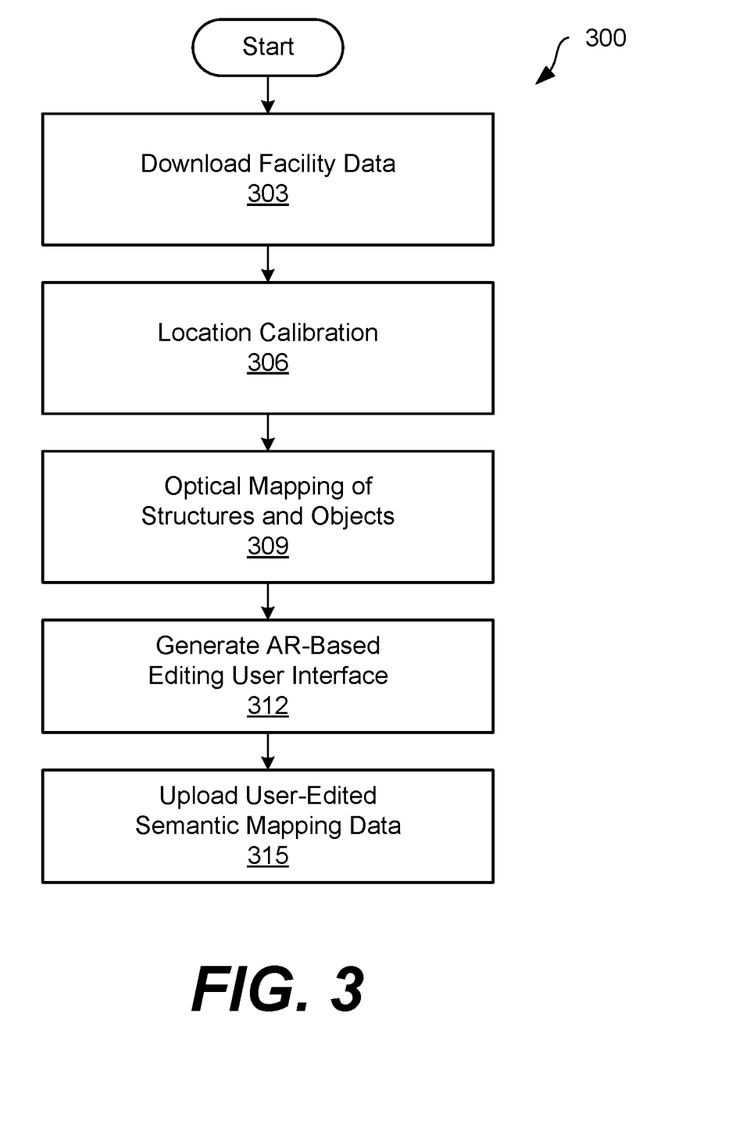
FIG. 3 is a flowchart that illustrates functionalities performed by an augmented reality facility mapping system, according to various aspects of the embodiments of the present disclosure.

FIG. 3 shows a flowchart 300 that describes functionalities performed by the AR mapping system 200. Specifically, the flowchart 300 shows steps that describe how the AR device 101 maps a facility environment 100. While the steps are described as being performed by the AR mapping application 205 of the AR device 101, other components of the AR mapping system 200 can perform aspects of the various actions.

In step 303, the AR mapping application 205 can download facility data for a particular facility environment 100. The AR mapping application 205 can identify the local facility environment 100 using GPS data and other sensor data 212. Alternatively, the AR mapping application 205 can identify a user selection of the particular facility environment 100 through a user interface. The AR mapping application 205 can transmit an identifier of the facility environment 100 to the server layer mapping application 243.

The server layer mapping application 243 can identify preexisting or predetermined facility data including a CAD drawing of the facility environment 100. In some examples, preexisting semantic mapping data 220 can also be identified. The server layer mapping application 243 can transmit the facility data back to the AR mapping application 205. The AR mapping application 205 can convert the CAD drawing of the facility environment 100 into a three dimensional AR map.

In step 306, the AR mapping application 205 can perform a location calibration process. The AR mapping application 205 can identify fiducial data 227 from the received facility data. The user of the AR device 101 can face the camera device 104 at a fiducial. The AR mapping application 205 can process the optical data 215 to identify a particular fiducial in the fiducial data 227. The fiducial data 227 can include known locations for fiducials in the facility environment 100. The AR mapping application 205 can identify a position of the AR device 101 using this information.

In step 309, the AR mapping application 205 can perform optical mapping sensor data 212 detected in the facility environment 100 to an AR map 221 and objects 224. The AR mapping application 205 can provide the optical data 215 and position data 218 as inputs for recognition algorithms from the recognition data 233. The AR mapping application 205 can use the recognition algorithms generate updates to the AR map 221, as well as identify an AR map 221 and objects 224. If there is no CAD drawing as a starting point, the optical mapping can include full generation of an AR map 221 based on the sensor data 212.

In some examples, the AR mapping application 205 can generate instructions for the user of the AR device 101 to move to a particular position such as a location and orientation to facilitate the initial mapping or verification of the initial AR map 221 of the facility environment 100.

The AR mapping application 205 can include a mapping component 207 that uses the sensor data 212 to automatically identify semantic mapping data 220, including the AR map 221, objects 224, fiducial data 227, object identifiers 229, and certain visually-apparent semantic labels 231. The mapping component 207 can use the recognition data 233 to map the sensor data 212 to the AR map 221, objects 224, fiducial data 227, object identifiers 229, and semantic labels 231.

In step 312, the AR mapping application 205 can generate an AR-based editing user interface. The AR mapping application 205 can include an modification component 208 that generates AR-based modification user interface elements 108 that prompt or otherwise enable a user to edit or modify the semantic mapping data 220. This allows the user in the field to quickly and effectively apply additional semantic labels 231 to selected objects 224. The user can user hand gestures, touch inputs to a touchscreen device, physical button clicks on AR peripheral devices, and other inputs to interact with the AR-based user interface elements 108. Further aspects of the editing process are described with respect to FIG. 4.

In step 315, the AR mapping application 205 can upload user-edited semantic mapping data 220 to the server layer mapping application 243. In some examples, the AR mapping application 205 can also upload sensor data 212. This predetermined facility data can be stored in the datastore 246, and can be provided to other AR devices 101 that enter and move through the facility environment 100.

Figure 4:
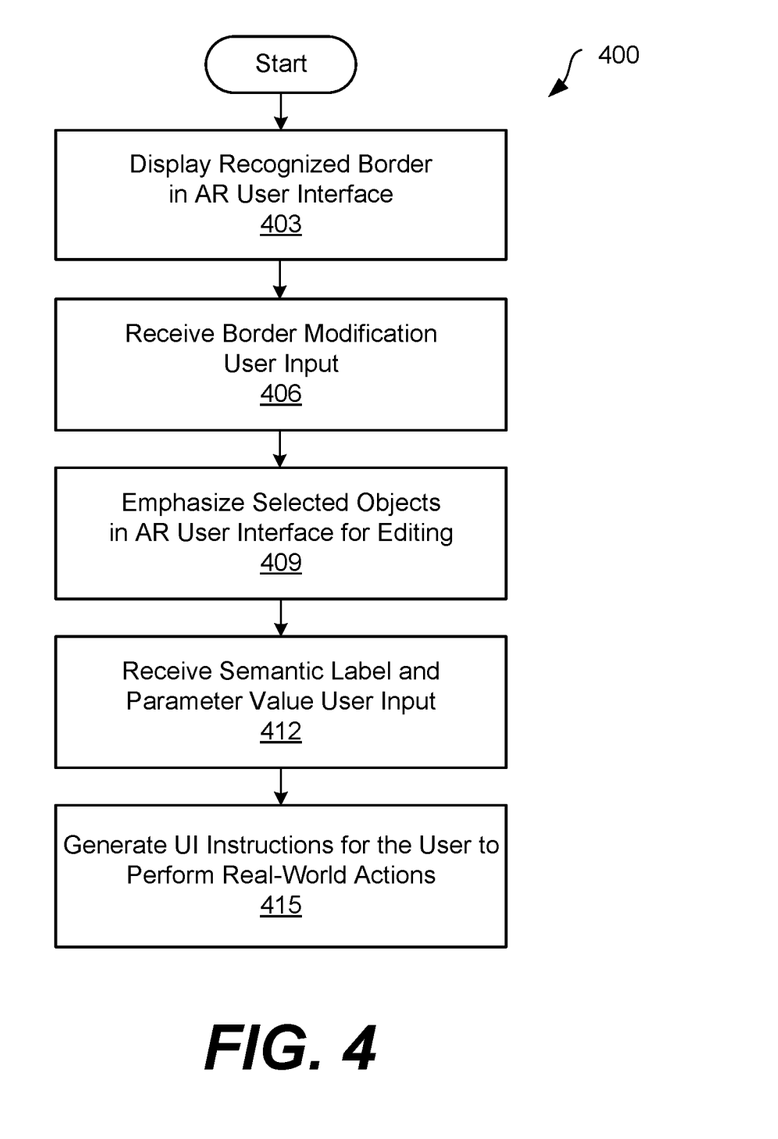
FIG. 4 is a flowchart that illustrates additional functionalities performed by an augmented reality facility mapping system, according to various aspects of the embodiments of the present disclosure.

FIG. 4 shows a flowchart 400 that describes functionalities performed by the AR mapping system 200. Specifically, the flowchart 400 shows steps that describe how the AR device 101 enables AR-based modifications to semantic mapping data 220 for a facility environment 100. While the steps are described as being performed by the AR mapping application 205, other components of the AR mapping system 200 can perform aspects of the various actions.

In step 403, the AR mapping application 205 can display a recognized border of an AR object 224 in an AR-based map and environment modification user interface. As the AR mapping application 205 receives sensor data 212, it can process the sensor data 212 locally or in concert with the server layer mapping application 243. The AR mapping application 205 can process the sensor data 212 using the recognition data 233 to generate and update an AR facility map. The AR mapping application 205 can update the user interface to include outlines of recognized objects 224 in the AR facility map.

In step 406, the AR mapping application 205 can receive a border modification user input through the AR-based user interface. The AR-based user interface can include tools that enable a user to edit the outlines of the objects 224. The AR mapping application 205 can recognize a user selection of a border based on an AR gesture of a user's hand in the field of view of the camera device 104, a touch gesture on a touchscreen, a physical button press of an AR controller device, or another user input. The AR gesture can include a hand grabbing gesture relative to the border of the object. The touch gesture can include a touch and hold gesture on the border of the object. The user can maintain a user input such as a closed hand of the grabbing gesture, a finger press on the touch screen, or the physical button press of the AR controller device while moving the hand or finger to a new location. The AR mapping application 205 can modify the selected border based on the user input that is identified.

In step 409, the AR mapping application 205 can emphasize automatically identified objects 224 in the AR-based map modification user interface for editing. The AR mapping application 205 can include a set of predefined label rules that indicate information such as types of parameters or semantic labels 231 that are expected. The AR mapping application 205 can determine that an automatically recognized AR object 224 lacks a particular type of semantic label 231. For example, the label rules can indicate that respective object types for staging areas, chutes, sorters, conveyors, stations, wireless access point devices, cameras, gantry systems, and other items can require a semantic label 231 that specifies "object identifier" as the label type and specifies a particular object identifier 229 as a value.

The AR mapping application 205 can identify an AR object 224. If the AR object 224 has a textual label with its unique object identifier 229, the AR mapping application 205 can parse the image data to recognize text indicating the unique object identifier 229. The AR mapping application 205 can then associate the AR object 224 with a semantic label 231 indicating the object identifier 229. Likewise, if the AR object 224 has a fiducial attached to it, the AR mapping application 205 can parse the image data to recognize the fiducial, identify fiducial data 227 that includes the object identifier 229, and associate the AR object 224 with a semantic label 231 specifying the object identifier 229.

The AR mapping application 205 can visually emphasize the AR object 224 in the AR-based user interface if no object identifier 229 is identified. This can prompt a user to edit the AR object 224 to include additional information. The AR mapping application 205 can also provide an AR-based user interface element 108 such as a menu or overlay that describes the lacking information.

In step 412, the AR mapping application 205 can receive a semantic label 231 defining user input through the AR-based user interface. The AR-based user interface element 108 can prompt the user to identify the AR object 224. The user can use a hand gesture or otherwise interact with the user interface to select the AR-based user interface element 108. The AR mapping application 205 can update the user interface with options for the user to enter, select, or otherwise identify semantic labels 231. If the object type is unidentified, the AR device 101 can update the user interface to provide a list of object type defining semantic labels 231. Once the object type is automatically or manually identified, the AR mapping application 205 can update the user interface to provide a list of object identifiers 229 for that type of AR object 224.

The list of unique object identifiers 229 can be a list of object identifiers 229 that are known to be present in the facility environment 100. The AR-based user interface can also provide an AR-based user interface element 108 that describes how to identify an object identifier 229. In some examples, the object identifier 229 can be indicated on a physical label, and the AR-based user interface element 108 can indicate where the physical label is generally found on that type of AR object 224. The user can select or enter the object identifier 229. The AR device 101 can also provide additional types of semantic labels 231 that can be applied to the type of AR object 224.

In step 415, the AR mapping application 205 can provide user interface instructions for the user to perform real-world actions. This can include repositioning the AR device 101. For example, AR object 224 can be recognized but the current angle of the AR device 101 can be insufficient to obtain a threshold confidence in the object type. In response, the AR mapping application 205 can generate an AR-based user interface element 108. The AR mapping application 205 can provide arrow elements and textual descriptions that can instruct a user to walk around a particular AR object 224, view an AR object 224 from another angle, and so on.

The AR mapping application 205 can also identify that a real-world object corresponding to an AR object 224 should be repositioned within the facility environment 100. The server layer mapping application 243 can identify real-world facility modification directions that are downloaded from the server-layer mapping application 243 as predetermined facility data. The AR mapping application 205 can generate instructions to locate and reposition the real-world object.

The AR mapping application 205 can also determine that nearby areas within a threshold distance from the AR device 101 have not been updated using sensor data 212, or have not been updated for a threshold period of time. In response, the AR mapping application 205 can generate an AR-based user interface element 108 that includes instructions such as arrow elements and textual instructions to go to that area of the facility environment 100. This can increase the speed and efficiency of the user moving through the facility environment 100 to generate and update semantic mapping data 220.

Figure 5:
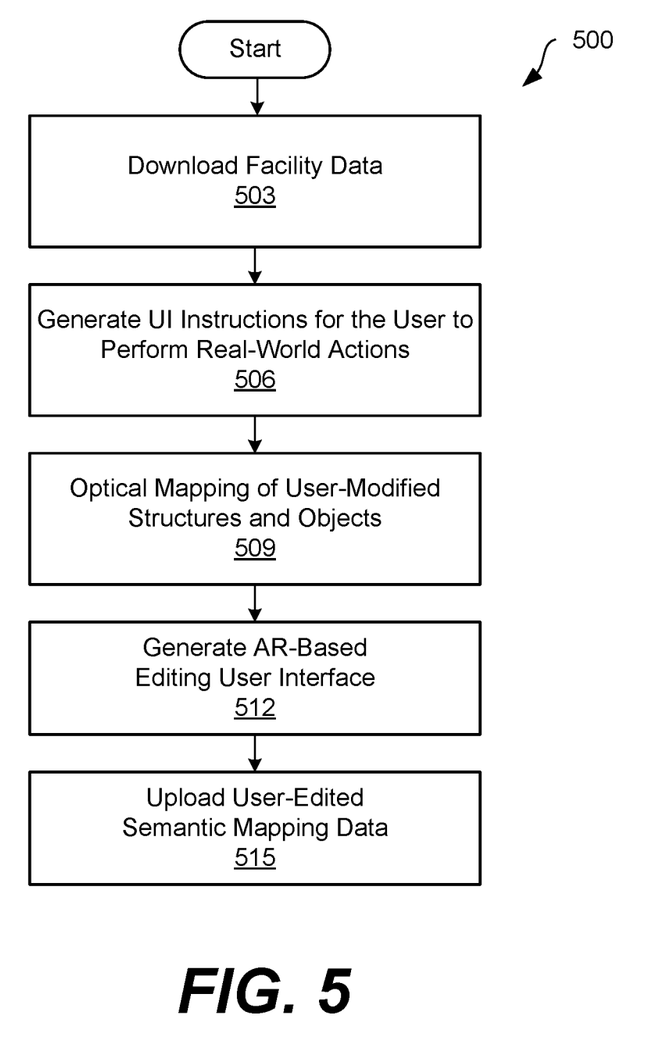
FIG. 5 is a flowchart that illustrates additional functionalities performed by an augmented reality facility mapping system, according to various aspects of the embodiments of the present disclosure.

FIG. 5 shows a flowchart 500 that describes functionalities performed by the AR mapping system 200. Specifically, the flowchart 500 shows steps that describe how the AR device 101 enables a user to implement predetermined modifications to real-world aspects of a facility environment 100 according to instructions provided through the AR device 101. While the steps are described as being performed by the AR mapping application 205, other components of the AR mapping system 200 can perform aspects of the various actions.

In step 503, the AR mapping application 205 can download facility data for a particular facility environment 100. The AR mapping application 205 can identify the local facility environment 100 using GPS data and other sensor data 212. Alternatively, the AR mapping application 205 can identify a user selection of the particular facility environment 100 through a user interface. The AR mapping application 205 can transmit an identifier of the facility environment 100 to the server layer mapping application 243.

The server layer mapping application 243 can identify preexisting or predetermined facility data including a CAD drawing of the facility environment 100. The predetermined facility data can include instructions to implement predetermined modification directions for real-world aspects of a facility environment 100. A designer, administrator, or another user can design a desired real-world state for the facility environment 100. The desired real-world state can include specific placements of real-world objects corresponding to the AR objects 224. However, the facility environment 100 can be in an undesired state where the real-world objects are absent or placed in an undesired location. The predetermined facility data can identify a current location of the real-world objects so the user interface of the AR mapping application 206 can provide instructions to retrieve the real-world objects for placement. The server layer mapping application 243 can transmit the predetermined facility data back to the AR mapping application 205.

In step 506, the AR mapping application 205 can generate user interface elements 108 that instruct the user to perform real-world actions that modify the facility environment 100. The facility modification instructions can include walking directions including arrows, two-dimensional overlay maps, and three-dimensional overlay maps that instruct the user to a location of a real-world object to be moved or placed. The real-world objects can be at a generalized location such as a loading dock or another staging area. In the case of a staging area, the specific location within the staging area may not be known. However, in other examples, the real-world objects can already be in a specific location in the facility environment 100.

The AR mapping application 205 can use the sensor data 212 to optically recognize the real-world object based on data associated with its corresponding AR object 224. The AR mapping application 205 can then generate a user interface element 108 that prompts a user to confirm that the user has obtained or retrieved the real-world object. Alternatively, a user can navigate a user interface of the AR mapping application 205 to manually indicate that the real-world object is obtained.

The AR mapping application 205 can generate user interface elements 108 that guide the user to a desired location for the real-world object. This can include step by step walking instructions or driving instructions. Once a desired location of the real-world object is in view of the AR device 101, the AR mapping application 205 can display the AR object 224 in a desired position. The AR mapping application 205 can visually emphasize the AR object 224 by a line type, line weight, line color, fill color, hatching, transparency effects, or highlight color that indicates that the user is to place the real-world object where the AR object 224 is shown. The real-world object can include any of the objects discussed herein, such as tape markings, staging areas, chutes, sorters, conveyors, stations, storage racks, fiducials, and others.

In step 509, the AR mapping application 205 can perform optical mapping sensor data 212 detected in the facility environment 100 to an AR map 221 and objects 224. This enables the AR mapping application 205 to identify updates to objects 224 and other AR map 221 features. For example, a person that is not wearing an AR device 101 can place some of the real-world objects before the facility data downloaded by the AR mapping application 205 reflects the update. The AR mapping application 205 can identify that the real-world object is placed and update the AR map 221 and objects 224. The AR mapping application 205 can also check off or remove the real-world objects from a list of incomplete facility modifications and add it to a list of completed facility modifications.

In step 512, the AR mapping application 205 can generate an AR-based editing user interface. The AR mapping application 205 can include a modification component 208 that generates AR-based modification user interface elements 108 that prompt or otherwise enable a user to edit or modify the semantic mapping data 220. The user can provide real-time modifications to semantic mapping data 200 for AR objects 224 corresponding to real-world objects that are placed or moved in the facility environment 100.

In step 515, the AR mapping application 205 can upload modified semantic mapping data 220 to the server layer mapping application 243. The modified semantic data 220 can include modifications to the positions of real-world objects according to facility modification instructions. The AR mapping application 205 can also upload sensor data 212. This predetermined facility data can be stored in the datastore 246, and can be provided to other AR devices 101 that enter and move through the facility environment 100.

Figure 6:
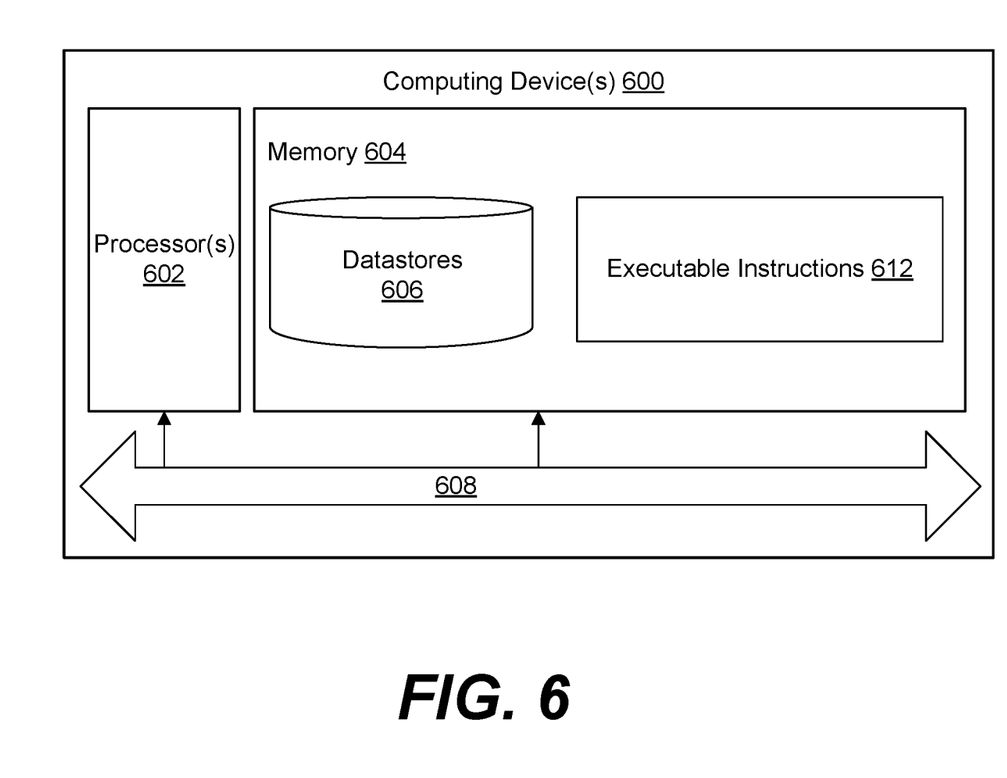
FIG. 6 illustrates an example computing device for an augmented reality facility mapping system, according to various aspects of the embodiments of the present disclosure.

As shown in FIG. 6, the computing device 600 includes at least one processing system, for example, having a processor 602 and a memory 604, both of which are electrically and communicatively coupled to a local interface 608. The local interface 608 can be embodied as a data bus with an accompanying address/control bus or other addressing, control, and/or command lines, for data communications and addressing between the processor 602, the memory 604, and the executable instructions 612. Executable instructions 612 of a computing device 600 of the AR device 101 can include the AR mapping application 205, among other applications. Executable instructions 612 executed by a computing device 600 of the computing environment 206 can include the server layer mapping application 243, among other applications.

In various embodiments, the memory 604 stores data and other software or executable-code components executable by the processor 602. The datastore 606 can include data related to the operation of the AR mapping system 200, and other data. Among others, the executable-code components of various computing devices 600 can include components associated with the AR mapping application 205, the server layer mapping application 243 and an operating system for execution by the processor 602. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc.

In various embodiments, the memory 604 can include both volatile and nonvolatile memory and data storage components. Volatile components are those that do not retain data values upon loss of power. Nonvolatile components are those that retain data upon a loss of power. Thus, the memory 604 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 604.

The processor 602 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the executable instructions 612 can represent one or more module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor 602 can be directed by execution of the program instructions to perform certain processes, such as those illustrated in the flowcharts described herein. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 602. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowcharts or process diagrams can be representative of certain methods or processes, functionalities, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 602. The machine code can be converted from the source code, etc. Further, each block can represent, or be connected with, a circuit or a number of interconnected circuits to implement a certain logical function or process step.

Although the flowcharts illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments described herein are not limited to the specifically described embodiments. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. An environment mapping system, the system comprising:
   an augmented reality (AR) device comprising at least one optical device and at least one position detection device; and
   at least one computing device of the AR device, the at least one computing device being configured to execute computer-readable instructions that, when executed, cause the at least one computing device to at least:
      download, by the AR device, facility data comprising a computer aided design (CAD) file of a facility environment;
      generate, by the AR device, an AR map of the facility environment using the CAD file, wherein the AR map is displayed in an AR-based modification user interface;
      detect, by the AR device, optical data using the at least one optical device, and position data using the at least one position detection device;
      update, by the AR device, the AR-based modification user interface to include an AR object, wherein the AR object is placed in the AR map based at least in part on the optical data and the position data that identifies a real-world object corresponding to the AR object;
      visually emphasize, by the AR device, the AR object for editing based at least in part on identification that that the AR object lacks a semantic label that is required according to predefined label rules indicating semantic labels required for an object type identified for the AR object, wherein the semantic label comprises a property type and a property value; and
      receive, using the AR-based editing user interface, a user input that causes a modification of the AR object comprising an addition of the semantic label to the AR object.

2. The system of claim 1, wherein the modification of the AR object further comprises an AR-based user selection of a border of AR object that represents the real-world object that implements an update to the border of the AR object that represents the real-world object.

3. The system of claim 1, wherein the modification of the AR object comprises an update to an existing semantic label.

4. The system of claim 1, wherein the computer-readable instructions, when executed, further cause the at least one computing device to at least:
   upload, by the AR device to a server layer computing device, semantic data comprising an updated AR map that includes the AR object and the modification of the AR object.

5. A method for augmented reality (AR)-based semantic mapping, the method comprising:
   detecting, by an AR device, sensor data comprising: optical data detected using at least one optical device of the AR device, and position data detected using at least one position detection device of the AR device;
   displaying, by the AR device, an AR-based modification user interface comprising an AR map and an AR object, wherein the AR map is generated based at least in part on the sensor data detected by the AR device;
   visually emphasizing, by the AR device, the AR object for editing based at least in part on determining that the AR object lacks a particular type of semantic label that is required according to predefined label rules for the AR object or an object type identified for of the AR object; and
   updating, by the AR-based modification user interface, the AR object to add the semantic label to reflect a user action identified using AR-based modification user interface.

6. The method of claim 5, further comprising:
   downloading, by the AR device from a server layer device, facility data comprising a computer aided design (CAD) file of a facility environment, wherein an initial AR map is generated using the CAD file and the AR map is an updated AR map that is updated using the sensor data detected by the AR device.

7. The method of claim 6, further comprising:
   uploading, by the AR device to a server layer computing device, semantic data comprising an updated AR map that includes the AR object that is updated to reflect the user action.

8. The method of claim 5, further comprising:
   downloading, by the AR device from a server layer device, facility data comprising real-world facility modification directions comprising instructions to position a real-world object corresponding to the AR object, wherein the user action comprises an update to a position of the real-world object.

9. The method of claim 5, wherein updating the AR object comprises an addition of a unique object identifier of the AR object to the semantic label.

10. The method of claim 5, further comprising:
    transmitting, by the AR device, the sensor data to a server layer computing device; and
    receiving, by the AR device from the server layer computing device, data comprising the AR object.

11. The method of claim 5, further comprising:
    inputting, by the AR device, the sensor data into a recognition algorithm stored on the AR device; and
    identifying, by the AR device, the AR object based at least in part on an output from the recognition algorithm.

12. The method of claim 5, further comprising:
    calibrating, by the AR device, a location of the AR device based at least in part on a detection of a fiducial represented in the optical data.

13. The method of claim 5, further comprising:
    emphasizing, by the AR device, the AR object based at least in part on an identification that the AR object lacks a particular type of semantic label.

14. The method of claim 13, wherein the AR object is emphasized based at least in part on an identification that the AR object lacks a particular type of semantic label.

15. A non-transitory computer readable medium comprising instructions executable by at least one computing device, the instructions, when executed by the at least one computing device, causing the at least one computing device to at least:
    download, by an AR device from a server layer device, facility data associated with a particular facility environment;
    detect, by an AR device, sensor data comprising: optical data detected using at least one optical device of the AR device, and position data detected using at least one position detection device of the AR device;
    display, by the AR device, an AR-based modification user interface comprising an AR map and an AR object, wherein the AR-based modification user interface is generated based at least in part on the facility data and the sensor data;
    visually emphasize, by the AR device, the AR object for editing based at least in part on identification that the AR object lacks a particular type of semantic label that is required according to predefined label rules for the AR object or an object type identified for of the AR object; and update, by the AR-based modification user interface, the AR object to add the semantic label and reflect a user action in association with the semantic label that is identified by the AR device.

16. The non-transitory computer readable medium of claim 15, wherein the modification of the AR object comprises an update to an existing semantic label.

17. The non-transitory computer readable medium of claim 15, wherein the user action comprises interaction with a user interface element to update a border of the AR object.

18. The non-transitory computer readable medium of claim 15, wherein the user action comprises an addition of a unique object identifier in association with the semantic label added to the AR object.

19. The non-transitory computer readable medium of claim 15, wherein the semantic label comprises a property type and a property value.

20. The non-transitory computer readable medium of claim 15, wherein the AR device comprises a wearable device.

* * * * *